United States Patent
Ishibashi et al.

(10) Patent No.: US 9,280,403 B2
(45) Date of Patent: Mar. 8, 2016

(54) NODE INCLUDING A CPU WHICH IS CONNECTED TO OTHER NODES CONSTITUTING A COMPUTER SYSTEM

(75) Inventors: Shojiro Ishibashi, Yokosuka (JP); Takeyoshi Kumagai, Tokyo (JP)

(73) Assignees: JAPAN AGENCY FOR MARINE-EARTH SCIENCE AND TECHNOLOGY, Kanagawa (JP); SAS CO., LTD., Tokyo (JE)

( * ) Notice: Subject to any disclaimer, the term of this patent is extended or adjusted under 35 U.S.C. 154(b) by 0 days.

(21) Appl. No.: 13/982,699

(22) PCT Filed: Jan. 31, 2012

(86) PCT No.: PCT/JP2012/052150
§ 371 (c)(1),
(2), (4) Date: Sep. 3, 2013

(87) PCT Pub. No.: WO2012/105560
PCT Pub. Date: Aug. 9, 2012

(65) Prior Publication Data
US 2013/0339981 A1   Dec. 19, 2013

(30) Foreign Application Priority Data
Jan. 31, 2011   (JP) .................................. 2011-018827

(51) Int. Cl.
*G06F 3/00* (2006.01)
*G06F 9/44* (2006.01)
(Continued)

(52) U.S. Cl.
CPC   *G06F 9/544* (2013.01); *G05B 9/03* (2013.01); *G06F 9/54* (2013.01); *G06F 11/1438* (2013.01);
(Continued)

(58) Field of Classification Search
CPC ...................................................... G06F 9/544
USPC .......................................................... 719/312
See application file for complete search history.

(56) References Cited

U.S. PATENT DOCUMENTS 5,522,045 A * 5/1996 Sandberg ...................... 709/215
6,219,672 B1 * 4/2001 Hirayama et al.
(Continued)

FOREIGN PATENT DOCUMENTS

| JP | 06-208524 A | 7/1994 |
| JP | 2000295294 A | 10/2000 |

(Continued)

OTHER PUBLICATIONS

International Search Report mailed Mar. 19, 2012 corresponds to PCT/JP2012/052150.
(Continued)

*Primary Examiner* — Timothy A Mudrick
(74) *Attorney, Agent, or Firm* — Hauptman Ham, LLP

(57) ABSTRACT

To facilitate changing a system configuration and allow having high redundancy in a computer system connecting a plurality of nodes. A node includes a CPU and constitutes a computer system. The node executes one or more processes and including predetermined functions. The node includes a shared memory that stores system information including process information related to each process executed by each node, in a state accessible from each process of its own node. In the node, the system information including the process information related to each process of its own node is multicast to the other nodes. A shared memory control process of the node receives the system information multicast from the other nodes and stores the system information in the shared memory.

9 Claims, 15 Drawing Sheets

(51) Int. Cl.
- G06F 9/46 (2006.01)
- G06F 13/00 (2006.01)
- G06F 9/54 (2006.01)
- G06F 11/14 (2006.01)
- G06F 11/20 (2006.01)
- G05B 9/03 (2006.01)
- G06F 11/30 (2006.01)

(52) U.S. Cl.
CPC .......... *G06F 11/1482* (2013.01); *G06F 11/203* (2013.01); *G06F 11/2025* (2013.01); *G06F 11/2033* (2013.01); *G06F 11/3055* (2013.01); *G05B 2219/2227* (2013.01); *G06F 11/2035* (2013.01); *G06F 11/2038* (2013.01); *G06F 11/2043* (2013.01); *G06F 11/3006* (2013.01)

(56) References Cited

U.S. PATENT DOCUMENTS

2007/0118700 A1* 5/2007 Mensching et al. .......... 711/147
2007/0220298 A1* 9/2007 Gross et al. .................... 714/2

FOREIGN PATENT DOCUMENTS

| JP | 2000-339179 A | 12/2000 |
|----|---------------|---------|
| JP | 2001-075837 A | 3/2001 |
| JP | 2001-166967 A | 6/2001 |
| JP | 2001268094 A | 9/2001 |
| JP | 2004-102492 A | 4/2004 |
| JP | 2004246746 A | 9/2004 |
| JP | 2008210151 A | 9/2008 |

OTHER PUBLICATIONS

International Preliminary Report on Patentability mailed Aug. 15, 2013, corresponding to International application No. PCT/JP2012/052150.

* cited by examiner

*Fig.3*

| THE NUMBER OF ROTATIONS OF THRUSTERS |
|---|
| DVL SPEED |
| INS LATITUDE AND LONGITUDE |
| ⋮ |

NODE INCLUDING A CPU WHICH IS CONNECTED TO OTHER NODES CONSTITUTING A COMPUTER SYSTEM

RELATED APPLICATIONS

The present application is a National Phase of International Application Number PCT/JP2012/052150, filed Jan. 31, 2012, and claims priority from, Japanese Application Number 2011-018827, filed Jan. 31, 2011.

TECHNICAL FIELD

The present invention relates to a node that includes a CPU (Central Processing Unit) and that is connected to other nodes to constitute a computer system.

BACKGROUND ART

Conventionally, a computer system connecting a plurality of computers to allow mutual transmission and reception of information is known (for example, see Patent Literature 1 below).

CITATION LIST

Patent Literature

Patent Literature 1: Japanese Patent Laid-Open No. 6-208524

SUMMARY OF INVENTION

Technical Problem

An example of a system connecting a plurality of nodes including CPUs includes a distributed multi-CPU control system applied to an undersea device and the like. In the system, a plurality of processes with single functions are simultaneously operated on each CPU board that is a node, and each process controls actuators and sensors.

In the conventional distributed multi-CPU control system, in order for each process to share information managed by another process on the same node or managed by a process on another node, each piece of information needs to be individually transmitted and received between the processes. Additionally, when a process is dynamically terminated or activated (reactivated) on a node or when nodes are increased or decreased, information required for the communication (for example, IP (Internet Protocol)) needs to be changed in each case according to the current system state or the configuration. In a device, such as an undersea device, that requires long-term operation, high redundancy that allows continuation of the operation of the entire system even if there is a malfunction in one of the nodes is necessary.

The present invention has been made in view of the foregoing, and an object of the present invention is to provide a node that facilitates changing a system configuration and that allows having high redundancy in a computer system connecting a plurality of nodes.

Solution to Problem

To attain the object, an embodiment of the present invention provides a node that includes a CPU and that is connected to other nodes to constitute a computer system, the node including: process execution means for executing one or more processes including predetermined functions; a shared memory that stores system information including process information related to each process executed by each node included in the computer system, in a state accessible from each process executed by the process execution means; system information transmission means for multicasting system information including process information related to each process executed by the process execution means in the system information to the other nodes; and system information storage means for receiving the system information multicast from the other nodes to store the system information in the shared memory.

In the node according to the embodiment of the present invention, the process information related to its own node is input to the other nodes by multicast. Meanwhile, the process information related to the other nodes are input by multicast and stored in the shared memory. The information stored in the shared memory is accessed from each process executed in its own node. Therefore, the information does not have to be individually transmitted and received between the processes executed in each node, and the system information including the process information related to each process is shared between the nodes. More specifically, in the node according to the embodiment of the present invention, the system configuration can be easily changed, and high redundancy can be included.

The process executed by the process execution means may cause the shared memory to store the process information related to its own process as the system information, and the system information transmission means may read the system information stored in the shared memory to multicast the system information to the other nodes. Alternatively, the process executed by the process execution means may constitute the system information transmission means to multicast the system information including the process information related to its own process to the other nodes. According to the configurations, the process information can be surely multicast, and the embodiment of the present invention can be appropriately and surely carried out.

The node may further include system management means for monitoring the system information stored in the shared memory to control the process or the node according to the system information. According to the configuration, the computer system can be appropriately managed.

The node may further include node management means for monitoring a state of its own node or the process executed by its own node to set information indicating the state as the system information multicast by the system information transmission means. According to the configuration, the computer system can be appropriately managed according to the state of the node.

The node may further include risk estimation means for estimating a risk of occurrence of abnormality in its own node or the process executed by its own node to set information indicating the estimated risk as the system information multicast by the system information transmission means, wherein the system management means may control the process or the node based on the risk estimated by the risk estimation means. According to the configuration, the computer system can be appropriately controlled before there is an abnormality, and the computer system can be further appropriately managed.

The node may further include communication means for communicating with an apparatus other than the computer system to transmit and receive the system information stored in the shared memory. According to the configuration, the computer system can be easily monitored and controlled from the outside of the computer system.

Advantageous Effects of Invention

Information does not have to be individually transmitted and received between processes executed by each node, and system information including process information related to each process is shared between nodes. More specifically, according to the present invention, the system configuration can be easily changed, and high redundancy can be included.

BRIEF DESCRIPTION OF DRAWINGS

FIG. 3 is a diagram showing system information according to the present embodiment.

DESCRIPTION OF EMBODIMENTS

Figure 1:
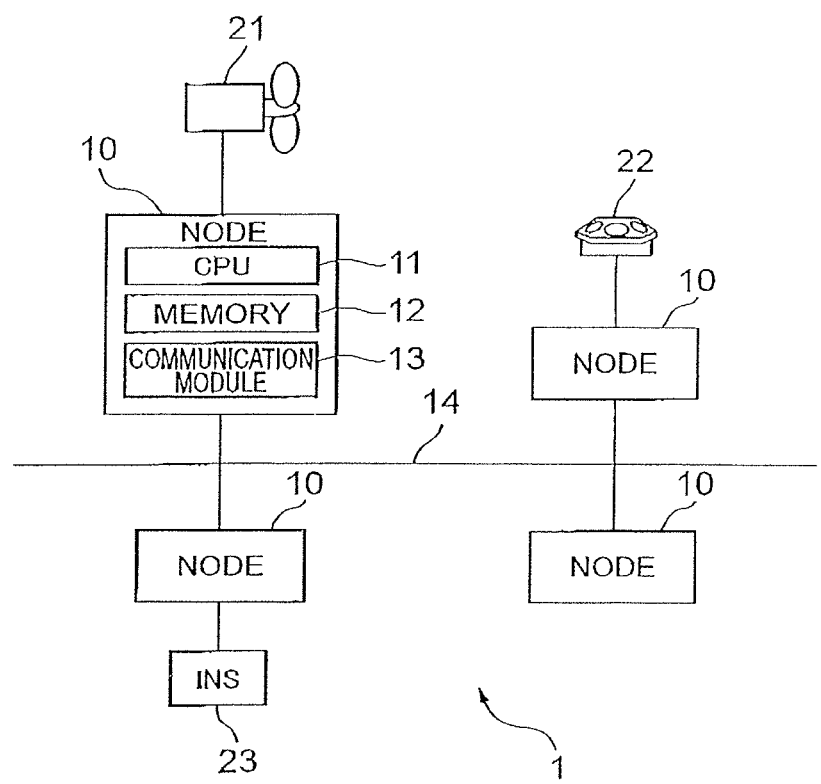
FIG. 1 is a diagram showing a distributed multi-CPU control system that is a computer system including a plurality of nodes according to an embodiment of the present invention.

Hereinafter, embodiments of a node according to the present invention will be described with reference to the drawings. In the description of the drawings, the same elements are designated with the same reference numerals, and the description will not be repeated.

FIG. 1 shows a distributed multi-CPU control system 1 that is a computer system including nodes 10 according to the present embodiment. The distributed multi-CPU control system 1 is used as a control system of an autonomous underwater vehicle, for example. A plurality of nodes 10, connected by a network 14 formed by cables and the like, can mutually transmit and receive information.

The node 10 is a CPU board including hardware, such as a CPU 11, a memory 12, and a communication module 13. The constituent elements constitute functional means of the node 10 described later. In the distributed multi-CPU control system 1, a plurality of nodes 10 are connected to each other through a network. In each node 10, a process with a single function that is a predetermined function is activated, and the process realizes a function of a control system.

For example, devices 21 to 23 arranged on an underwater vehicle are connected to the nodes 10 through cables or the like according to the nodes 10, and the nodes 10 (processes thereof) monitor and control the devices 21 to 23. Specifically, the devices 21 to 23 are thrusters (propulsion apparatuses) 21 used to propel the underwater vehicle, a speed meter (DVL: Doppler Velocity Log) 22 that measures speed of the underwater vehicle, an inertial navigation system (INS: Inertial Navigation System) 23 that measures position of the underwater vehicle in the sea, or the like.

Each process can use information obtained by other processes. For example, a process of controlling the thrusters 21 determines details of the control of the thrusters 21 based on information of speed measured by the speed meter 22 obtained by a process of monitoring the speed meter 22 and position (latitude and longitude) measured by the inertial navigation system 23 obtained by a process of monitoring the inertial navigation system 23.

As described, in the conventional distributed multi-CPU control system, each process individually communicates with other processes to share information. Therefore, with an increase in the number of nodes and the number of processes, complicated coding software is necessary to share system information. Sharing of information between processes according to the present invention allows the distributed multi-CPU control system 1 to easily change the system configuration and to have high redundancy.

<First Embodiment>

Figure 2:
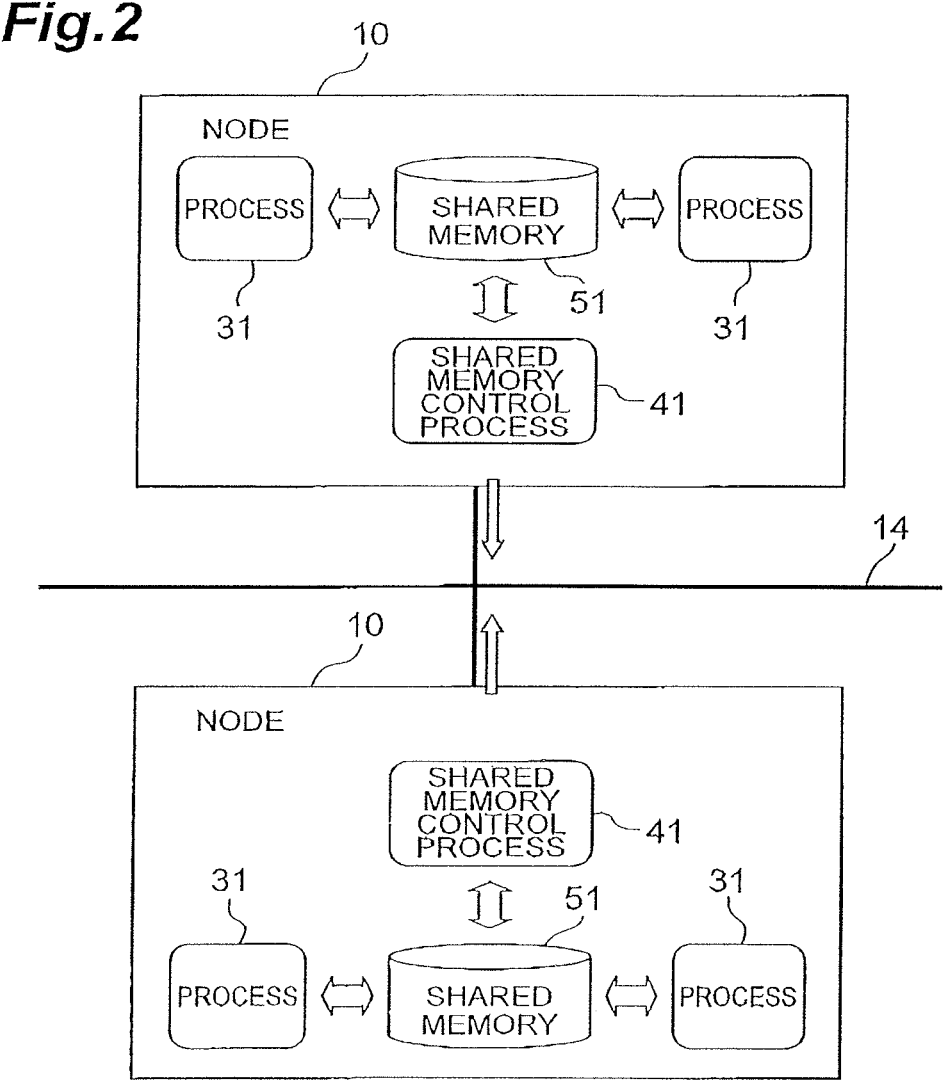
FIG. 2 is a diagram showing a functional configuration of the nodes according to a first embodiment of the present invention.

FIG. 2 shows a configuration of the nodes 10 according to a first embodiment. One or more processes 31 and 41 operate in the node 10. Process execution means constituted by the CPU 11, the memory 12, and the like included in the node 10 executes and operates the processes 31 and 41. The processes 31 and 41 are executed by, for example, reading and executing programs stored in the node 10, as in the conventional node. In the present embodiment, each process realizes functional means of the present invention as described later. The process 31 is a process that is also executed by the conventional node and that is for monitoring and controlling the devices described above, for example.

The node 10 further includes a shared memory 51. The shared memory 51 is a memory for storing system information including process information related to each process executed by each node 10 included in the distributed multi-CPU control system 1. The process information is information related to the functions of each process and is, for example, information managed by each process 31, such as thruster speed (the number of rotations of the thrusters) output from the thrusters 21, speed (DVL speed) measured by the speed meter 22, and information indicating the position (INS latitude and longitude) measured by the inertial navigation system 23. The process information is assembled and arranged (unified) in a certain format as shown in FIG. 3 to form the system information. The information included in the system information is common in the distributed multi-CPU control system 1, and the information can be managed or used by the processes of all nodes 10.

The shared memory 51 stores the system information in a state accessible from the processes 31 and 41 in its own node 10. Each process 31 in its own node 10 refers to the system information stored in the shared memory 51 to acquire information necessary for the function of its own process 31. Furthermore, each process 31 puts the process information related to its own process 31 into the system information and stores the information in the shared memory 51. More specifically, each process 31 updates the process information in the system information stored in the shared memory 51, by the process information managed by its own process 31. For example, the process 31 updates the information of DVL speed in the system information, by the information of DVL speed managed by the process 31 every certain time (for example, every 100 ms). Alternatively, when the information of DVL speed is newly acquired by monitoring the speed meter 22, the process 31 may update the information of DVL speed in the system information by the newly acquired information of DVL speed.

A shared memory control process 41 among the processes 31 and 41 is a process related to the function of the present embodiment. The shared memory control process 41 is system information transmission means for multicasting the process information including each process 31 of its own node 10 in the system information to the other nodes 10 as system information. The multicast is performed for all nodes 10 included in the distributed multi-CPU control system 1.

For example, the shared memory control process 41 refers to the shared memory 51 every certain time (for example, every 100 ms) to acquire (read) the system information to multicast the information to the other nodes 10. Alternatively, the shared memory control process 41 monitors the shared memory 51 and acquires the system information to multicast the system information to the other nodes 10 when the system information is updated. The system information to be transmitted may include all process information stored in the shared memory 51 of its own node 10 or may include only process information updated in its own node 10.

The shared memory control process 41 is system information storage means for receiving the system information multicast from the other nodes 10 to store the system information in the shared memory 51. More specifically, the shared memory control process 41 updates the system information stored in the shared memory 51 of its own node 10, by the system information transmitted from the other nodes 10 (shared memory control processes 41 thereof).

In this case, to check the update of the system information and to maintain the shared memory 51, the shared memory control process 41 may always refresh the shared memory 51 before updating (storing) the system information. Alternatively, the shared memory control process 41 may refresh the shared memory 51 every certain time. This is the configuration of the nodes according to the first embodiment.

Figure 4:
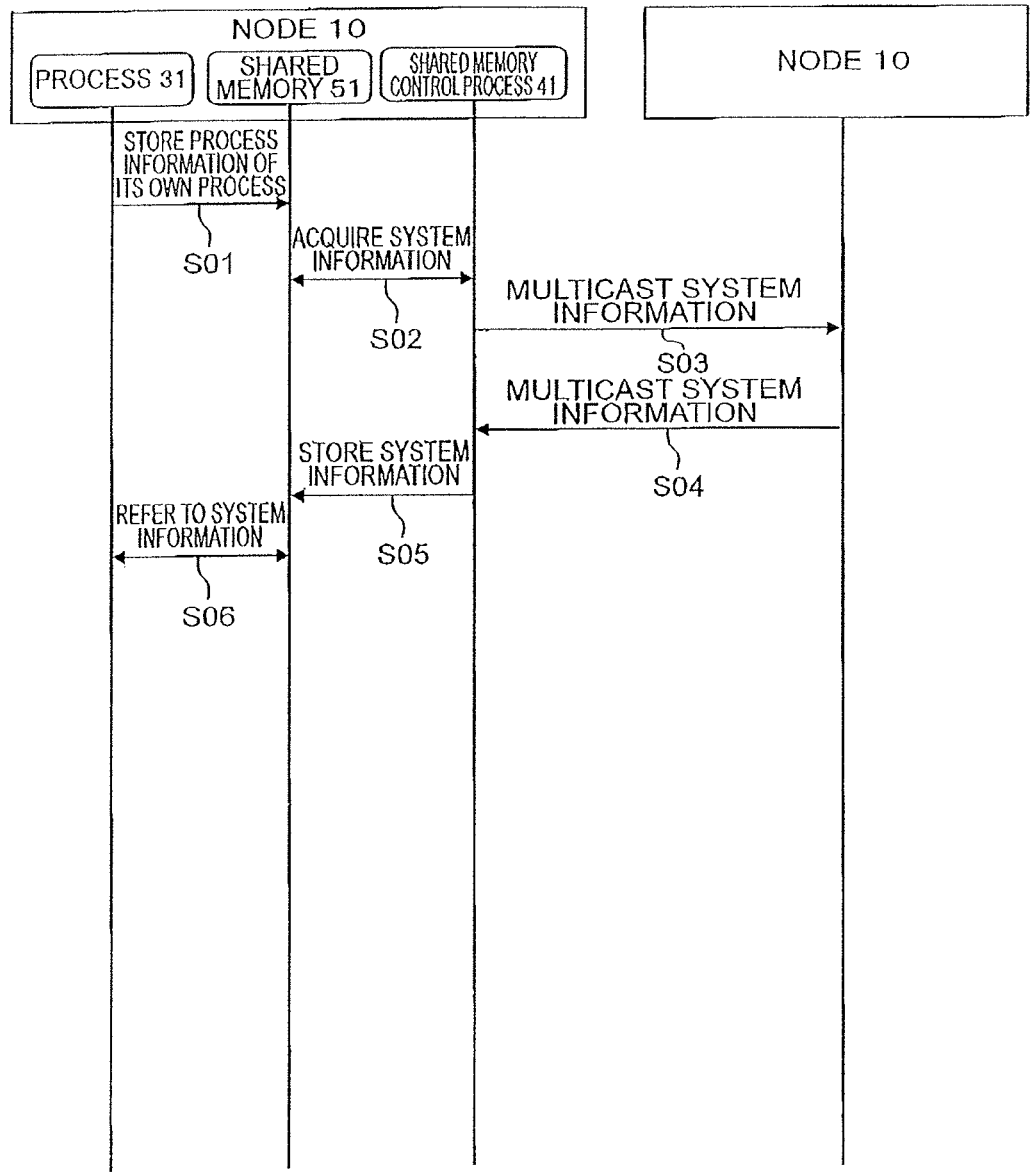
FIG. 4 is a sequence diagram showing a process executed by the nodes according to the first embodiment of the present invention.

Subsequently, a process executed by the nodes 10 according to the present embodiment will be described with reference to a sequence diagram of FIG. 4. The present process is always executed during the operation of the distributed multi-CPU control system 1.

In the node 10, each process 31 puts the process information related to its own process 31 into the system information and stores the information in the shared memory 51 (S01). Meanwhile, the shared memory control process 41 refers to the shared memory 51 to acquire the system information (S02). Subsequently, the acquired system information is multicast to the other nodes 10 from the shared memory control process 41 (S03).

The shared memory control process 41 receives the system information multicast from the other nodes 10 (by process equivalent to S02 and S03) (S04). Subsequently, the shared memory control process 41 stores the received system information in the shared memory 51 (505). Each process 31 refers to information necessary for the function of its own process 31 in the system information stored in the shared memory 51 (S06).

This is the process executed by the nodes 10 according to the present embodiment. In the nodes 10, the processes of S01 to S06 do not have to be executed in series, and the processes can be executed at respective timing. However, the process of S02 and the process of S03 form a set, and the process of S04 and the process of S05 form a set. In the present embodiment, in the shared memory 51, the process information related to the process 31 of its own node 10 in the system information is updated earlier than the process information in the system information of the other nodes 10.

As described, in the nodes 10 according to the present embodiment, the process information related to each process 31 is all stored in the shared memory 51 as system information and is used by each process 31. Individual transmission and reception of information between the processes are not necessary to share the information. Furthermore, in the present embodiment, the shared memory 51 and the shared memory control process 41 with the same functions in all nodes 10 are arranged. Each process 31 stores the information of its own process 31 in the shared memory 51, and necessary information can be realized by referring to the shared memory 51.

Therefore, when the system configuration is to be changed, the system information can be easily shared, and as a result, the change can be easily made. Since all system information is shared by the nodes 10, high redundancy and portability can be included. Therefore, the design of control and the exchange of system and devices are facilitated, and a robust system is established.

<Second Embodiment>

Figure 5:
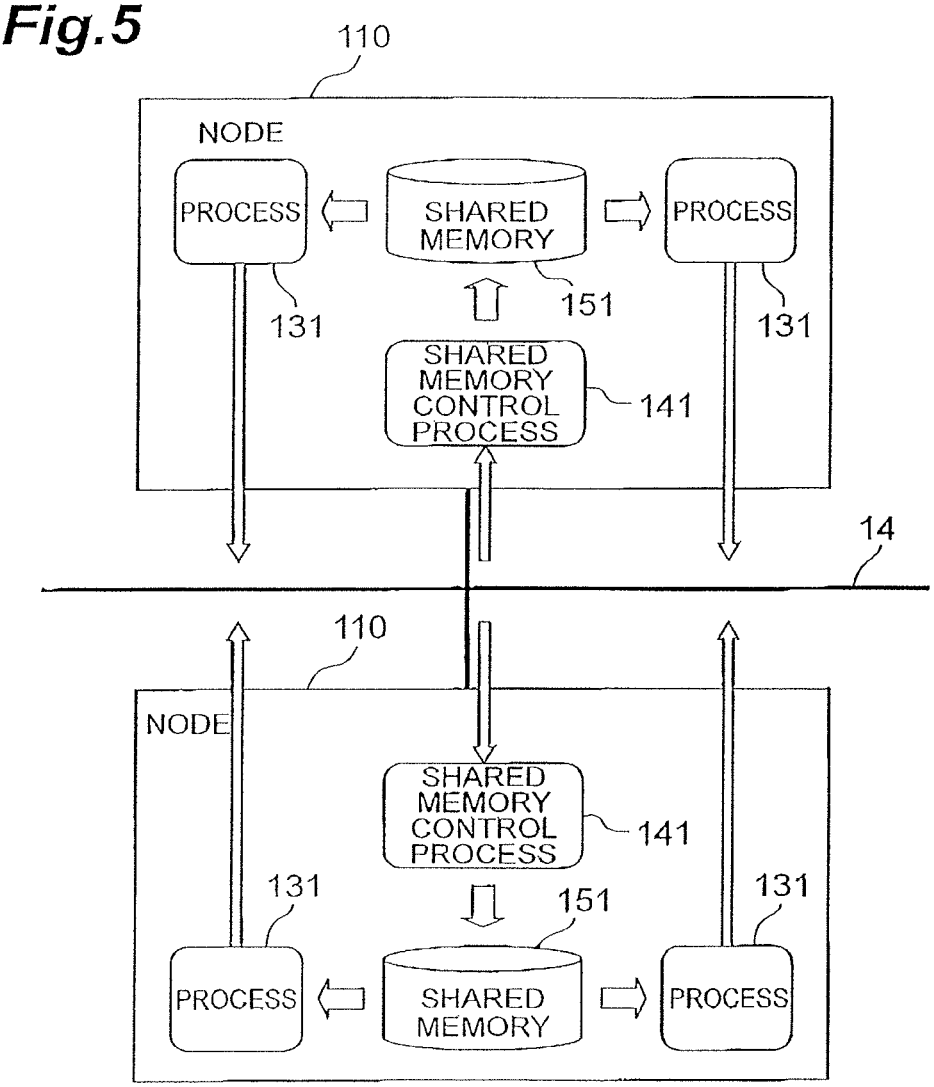
FIG. 5 is a diagram showing a functional configuration of nodes according to a second embodiment of the present invention.

FIG. 5 shows a configuration of nodes 110 according to a second embodiment. In the following description, differences from the first embodiment will be illustrated. Therefore, the parts without specific description are the same as in the first embodiment (the same applies to the following embodiments).

In the node 110, one or more processes 131 and a shared memory control process 141 are executed. The node 10 further includes a shared memory 151.

Each process 131 is system information transmission means for multicasting system information including process information related to its own process 131 to the other nodes 110. For example, the process 131 multicasts system information including information of DVL speed managed by the process 131 every certain time (for example, every 100 ms). Alternatively, when the information of DVL speed is newly acquired by monitoring the speed meter 22, the process 131 multicasts the system information including the acquired information of DVL speed. The system information to be transmitted may include all process information (other than that of its own process 131) stored in the shared memory 151 of its own node 110 or may include only process information updated by its own process 131. The multicast is performed for all nodes 110 (also for its own node 110 including the process 131) included in the distributed multi-CPU control system 1.

If the normality of the network is not secured and the system information is not shared between the nodes 110 due to a packet loss or the like, each process 131 backs up the system information including the process information managed by its own process 131 in the shared memory 151 of its own node 110.

In the present embodiment, the shared memory control process 141 does not perform the multicast. The shared memory control process 141 receives the system information multicast from the other nodes 110 or from its own node (process 131 thereof) and stores the system information in the shared memory 151, as in the first embodiment. This is the configuration of the nodes 110 according to the second embodiment.

Figure 6:
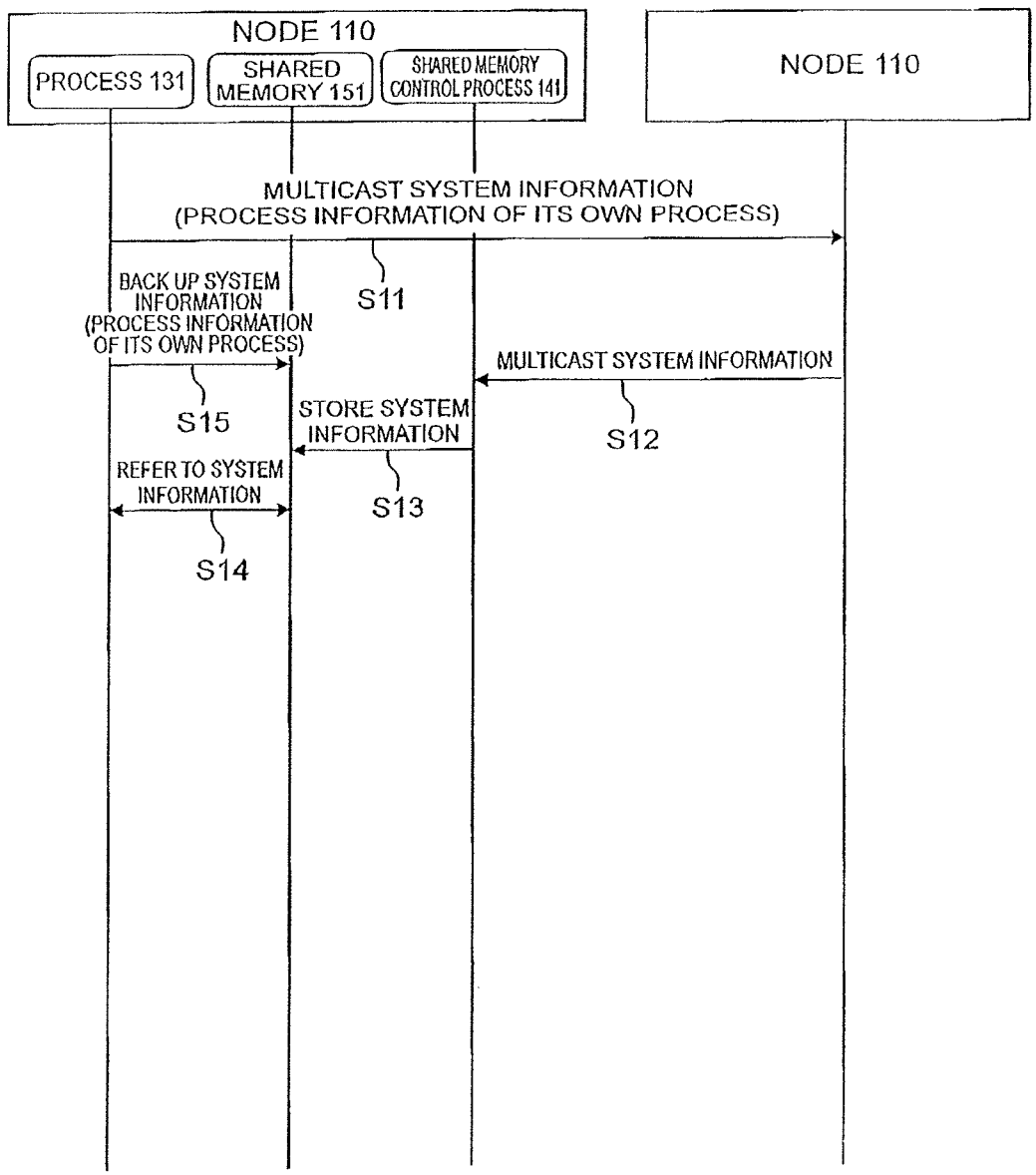
FIG. 6 is a sequence diagram showing a process executed by the nodes according to the second embodiment of the present invention.

Subsequently, a process executed by the nodes 110 according to the present embodiment will be described with reference to a sequence diagram of FIG. 6. The present process is always executed during the operation of the distributed multi-CPU control system 1.

In the node 110, each process 131 multicasts the system information including the process information related to its own process 131 to the other nodes 10 (S11). At the same timing as the multicast, each process 131 backs up the system information including the process information related to its own process 131 in the shared memory 151 of its own node 10 (S 15).

The shared memory control process 141 receives the system information multicast from the other nodes 110 (by process equivalent to S11) as system information (S12). Subsequently, the shared memory control process 141 stores the received system information in the shared memory 151 (S13). Each process 131 refers to the information necessary for the function of its own process 31 in the system information stored in the shared memory 151 (S14).

This is the process executed by the node 110 according to the present embodiment. In the node 110, the processes of S11 to S14 do not have to be executed in series, and the processes can be executed at respective timing. However, the process of S12 and the process of S13 form a set. In the present embodiment, since the system information including the process information of each process 131 is input to all nodes 110 at the same timing, the system information is updated at the same timing in the shared memory 151 of each node 110.

As described, the system information can also be easily shared in the configuration in which each process 131 multicasts the system information including the process information related to its own process 131 to all nodes 110.

<Third Embodiment>

By the way, although the undersea device is designed for long time operation, if there is a malfunction in each process or each node in the conventional distributed multi-CPU control system, the process or the node cannot handle the malfunction by itself, and the entire undersea device needs to be recovered to handle the malfunction. However, reactivation of the system associated with a sudden malfunction, attachment and detachment of a measurement device or an observation device, and associated change in the configuration of the control system or the communication system (increase or decrease of nodes) are matters hard to avoid in the development and operation of the undersea device. In the undersea device based on long-term operation, self-restoration of the system is an essential matter in consideration of the operability.

In an embodiment described below, a system for solving the problem by using a system in which the system information is shared between the nodes according to one of the two embodiments described above will be described.

Figure 7:
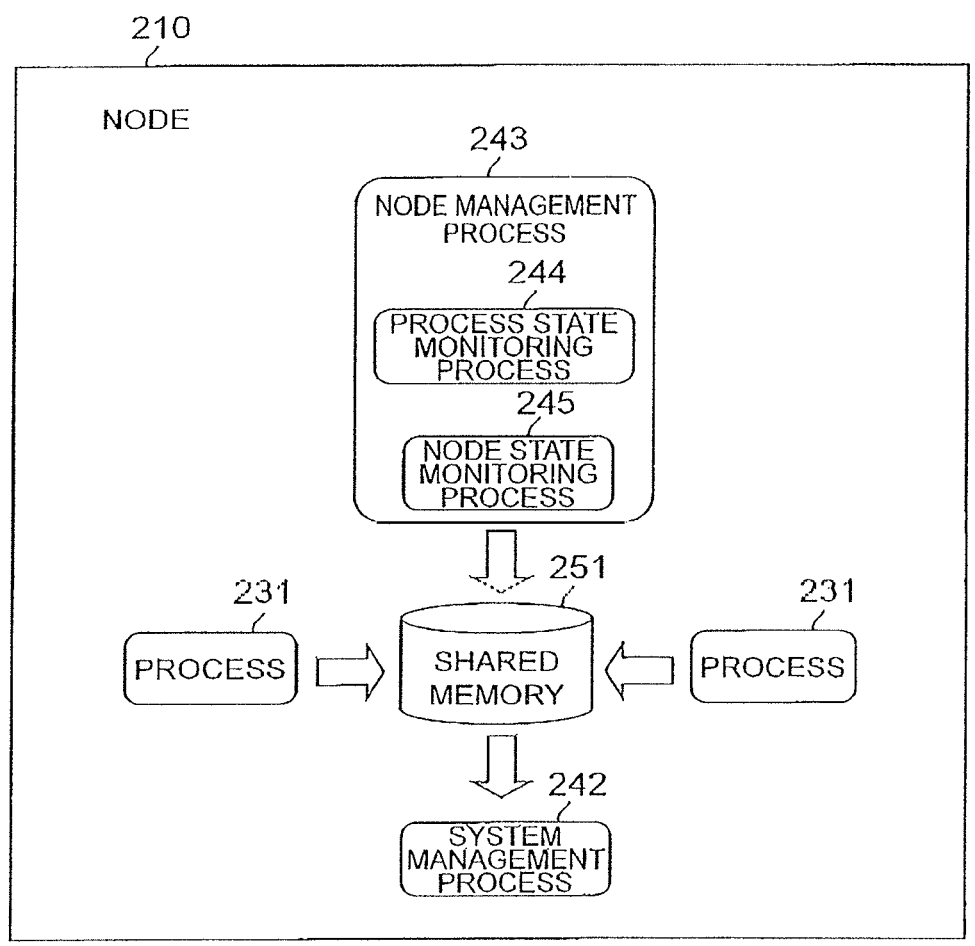
FIG. 7 is a diagram showing a functional configuration of a node according to a third embodiment of the present invention.

FIG. 7 shows a configuration of a node 210 according to the present embodiment. In the node 210 according to the present embodiment, a system management process 242 and a node management process 243 are executed in addition to the processes described in the embodiments above.

The system management process 242 is system management means for monitoring system information stored in a shared memory 251 to control a process 231 or the node 210 according to the system information. As described, since the system information is shared by all nodes 210, the system management process 242 does not have to be executed in all nodes 210, and the execution by only a specific node 210 is necessary. As described later, the system management process 242 determines the necessity of the control and instructs the node management process 243 to execute the control.

The node management process 243 is a process of receiving the instruction from the system management process 242 to execute a process related to the control in its own node 210 and is equivalent to node management means. The node management process 243 is a node executed by all nodes 210 in the distributed multi-CPU control system 1. The node management process 243 includes a process state monitoring process 244 and a node state monitoring process 245. The operation of the node 210 by the node management process 243 includes termination of the node 210 from an activated state, activation of the node 210 from a terminated state, and reactivation of the node 210. The operation of the process by the node management process 243 includes termination of the process from an activated state, activation of the process from a terminated state, and reactivation of the process.

The process state monitoring process 244 is a process of monitoring the state of each process executed by its own node 210. An example of the state indicating the state of each process includes information, such as normal, abnormal, and dynamic reactivation, associated with an identification ID for identifying each process. The information obtained by monitoring each process is included in the system information by the process state monitoring process 244 and multicast. The multicast may be performed by a shared memory control process (not shown in FIG. 7) of its own node 210 as in the first embodiment or may be performed by the process state monitoring process 244 as in the second embodiment.

The node state monitoring process 245 is a process of monitoring the state of its own node 210. An example of the state indicating the state of its own node includes information, such as normal, abnormal, and dynamic reactivation, associated with an identification ID for identifying its own node. The information obtained by monitoring its own node 210 is included in the system information by the node state monitoring process 245 and multicast. The multicast may be performed by the shared memory control process of its own node 210 as in the first embodiment or may be performed by the node state monitoring process 245 as in the second embodiment.

For the monitoring by the process state monitoring process 244 and the node state monitoring process 245, a technique similar to conventional monitoring of the process state and the node state can be used.

The system management process 242 determines whether there is an abnormality in any of the nodes 210 and the processes 231 from the system information. In the determination, the information of the states of the processes and the nodes obtained by monitoring by the process state monitoring process 244 and the node state monitoring process 245 is referenced. The process information related to normal processes 231 may also be referenced for the determination.

If the system management process 242 determines that there is an abnormality in any of the nodes 210 and the processes 231, the system management process 242 performs control according to the abnormality. Specifically, the node 210 or the process 231 with the abnormality is reactivated. If the abnormality is not eliminated (repaired) after reactivations for the number of times set in the process 231, the node 210 with the executed process 231 may be reactivated according to the importance of the process. The node management process 243 executes the reactivation as described above. The system management process 242 instructs the node management process 243 executed in the node 210 to be reactivated or in the same node 210 as the process 231 to be reactivated to execute the reactivation.

The system management process 242 refers to the states of the nodes monitored by the node state monitoring process 245 to detect an addition, a detachment, an exchange of a node or a change in the state of a node (activate→ terminate, terminate→ activate, or reactivate). When these are detected, the system management process 242 controls the shared memory control process of each node 210 to share the system information between the nodes 210. This is the configuration of the nodes 210 according to the third embodiment.

Figure 8:
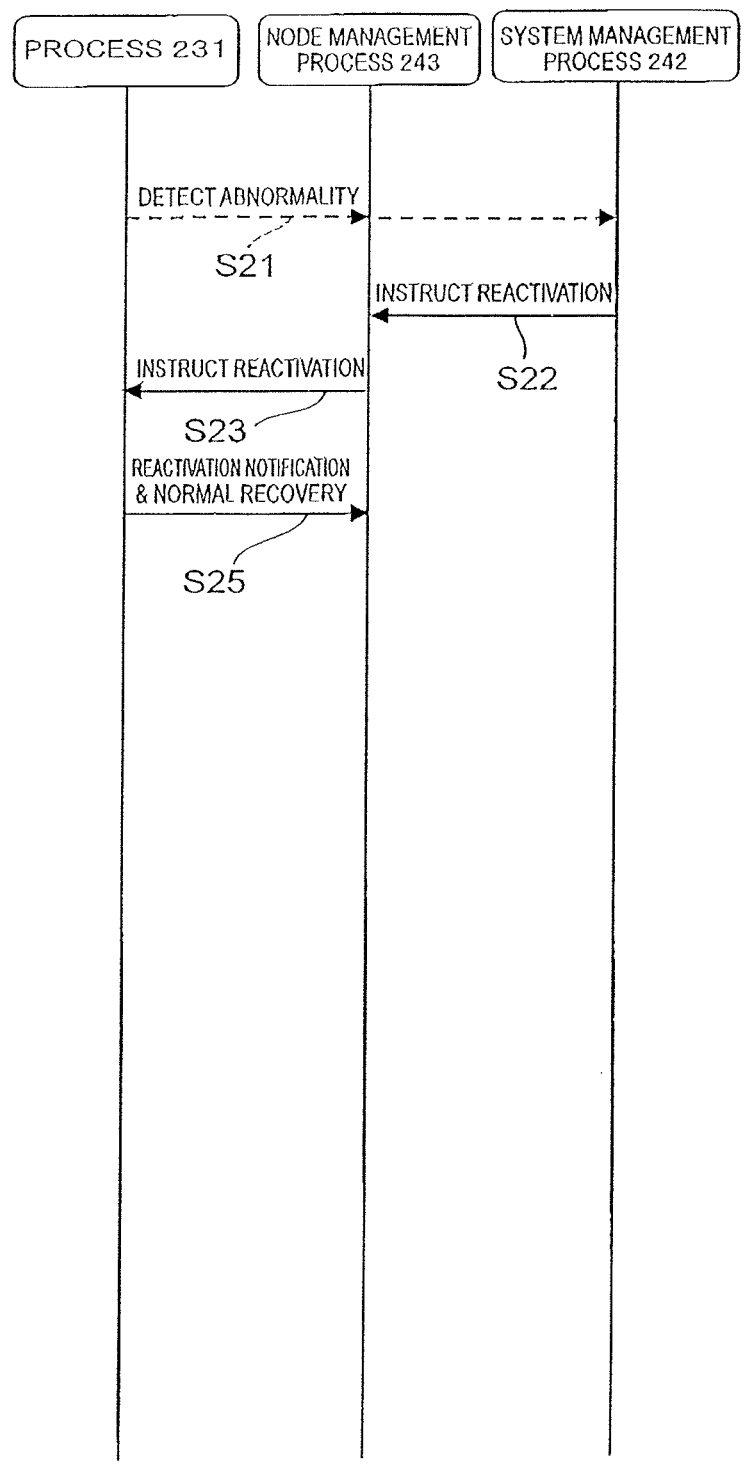
FIG. 8 is a sequence diagram showing a process executed by the node according to the third embodiment of the present invention.

Subsequently, a process executed by the node 210 (or between the nodes 210) according to the present embodiment will be described with reference to a sequence diagram of FIG. 8. The present process is executed when there is an abnormality in the process 231 of the node 210.

In the node 210, the process state monitoring process 244 of the node management process 243 monitors the process 231. When there is an abnormality in the process 231, the process state monitoring process 244 detects the abnormality (S21). The information of the detected abnormality is included in the system information and shared between the nodes 210. Subsequently, the system management process 242 refers to the system information to detect the abnormality of the process 231 (S21). The system management process 242 may be executed in a node 210 separate from the process 231 with the abnormality.

Subsequently, the system management process 242 determines to reactivate the process 231 with the abnormality in response to the detection of the abnormality. Subsequently, the system management process 242 instructs the node management process 243 of the node 210 with the executed process 231 to reactivate the process 231 (S22). The node management process 243 reactivates the process 231 when the reactivation instruction is received (S23). When the process 231 is reactivated, the process 231 notifies the node management process 243 of the activation and the normal recovery (S24). This is the process executed by the node 210 according to the present embodiment.

As described, in the node 210 according to the present embodiment, each node 210 and the process executed by each node 210 of the distributed multi-CPU control system 1 are controlled for normal operation. Therefore, the distributed multi-CPU control system 1 can be appropriately managed according to the node 210 and the process.

<Fourth Embodiment>

Figure 9:
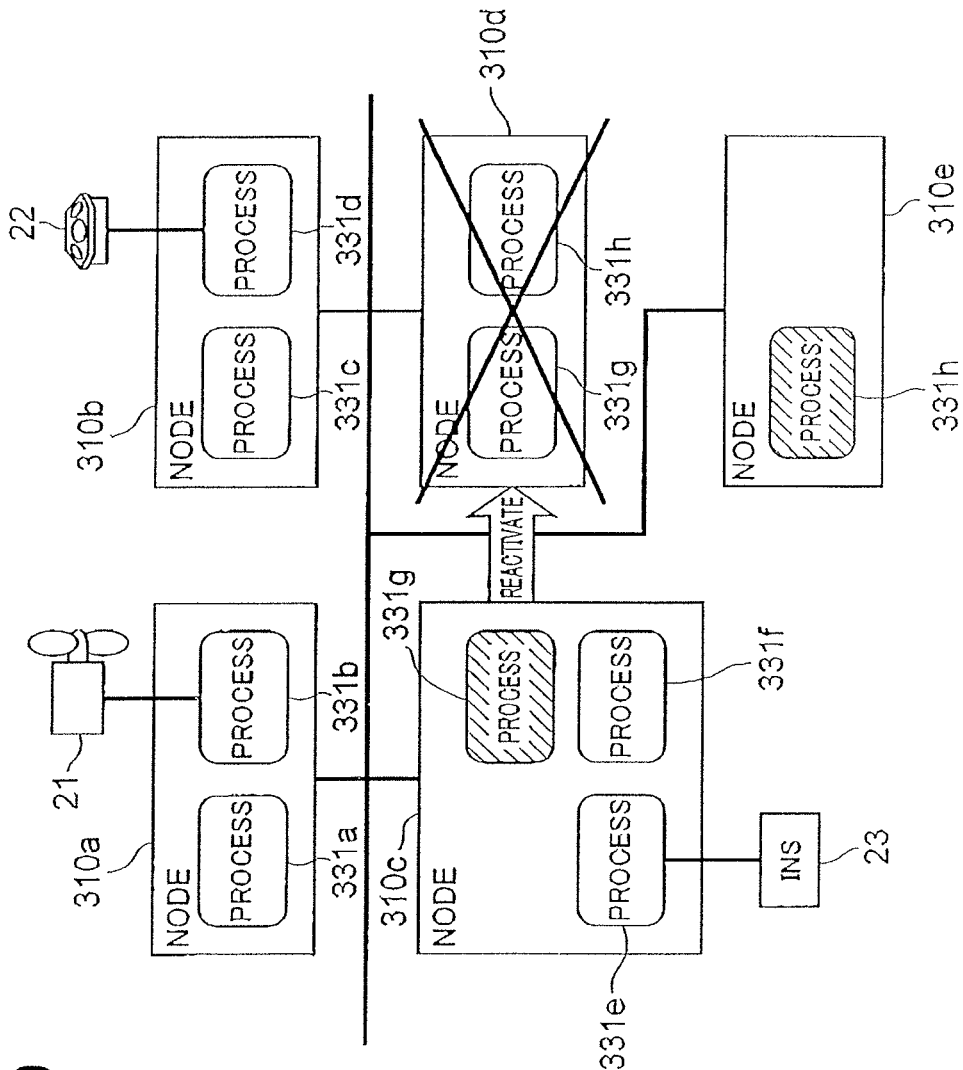
FIG. 9 is a diagram showing a configuration of a distributed multi-CPU control system including nodes according to a fourth embodiment of the present invention.

Subsequently, a variation of management based on the management of the distributed multi-CPU control system 1 according to the third embodiment will be illustrated. FIG. 9 shows a configuration of the distributed multi-CPU control system 1 including nodes 310a to 310e according to the present embodiment. In FIG. 9, the processes related to the functions of the present invention described above are omitted, and only normal processes 331a to 331h are illustrated. The hatched process 331g in the node 310c and the process 331h in the node 310e are not initially executed. These are activated in the course of the control.

In the present embodiment, when a node that monitors and manages the state of a node 310 is determined (that is, a node in which a system management process of monitoring and managing the state of a node 310 is executed), a specific node 310 may be selected in advance as a buddy (Buddy) in the distributed multi-CPU control system 1. Alternatively, a node may be determined according to the condition of the distributed multi-CPU control system 1. For example, a node 310 with the most stable operation among the currently activated nodes 310 may be selected.

In the present embodiment, when an abnormality of another node 310 is detected by referring to the system information, the system management process causes yet another node 310 to activate the process 331 executed in the other node 310. When an abnormality of another node 310 is detected by referring to the system information, the system management process may control the other node 310 to reactivate and may perform the control described above when the other node 310 is not normally restored by this control.

For the selection of the other node 310 for activating the process, the specific node stored in advance as the buddy (Buddy) in the system management process may be handled as a specific node for activating the alternative process. The node may be an already activated node or may be a node newly activated by the system management process. Alternatively, the node may be determined according to the condition of the distributed multi-CPU control system 1. For example, a node 310 with the lowest operating ratio among the currently activated nodes 310 is selected.

Figure 10:
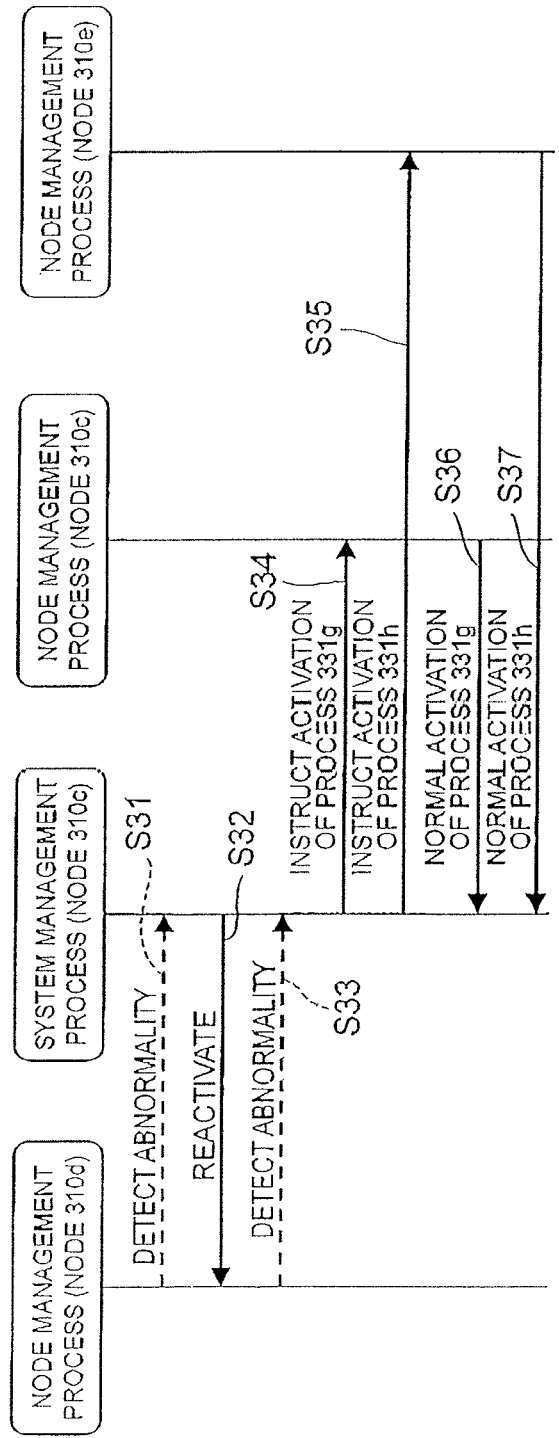
FIG. 10 is a sequence diagram showing a process executed by the distributed multi-CPU control system including the nodes according to the fourth embodiment of the present invention.

Subsequently, a process executed between the nodes 310 according to the present embodiment will be described with reference to a configuration diagram of FIG. 9 and a sequence diagram of FIG. 10. The present process is executed when there is an abnormality in the node 310d. In the present process, the system management process of managing the nodes 310a to 310e is executed in the node 310c.

When there is an abnormality in the node 310d, the system management process of the node 310c refers to the system information and detects the abnormality of the node 310d (S31). Subsequently, the system management process determines to reactivate the node 310d with the abnormality in response to the detection of the abnormality. Subsequently, the system management process instructs the node management process of the node 310d to reactivate the node 310d (S32). When the reactivation instruction is received by the node management process, the node 310d is reactivated. However, in the present process, the node 310d is not normally restored and remains in the abnormal state (no response of normal recovery). In this case, an abnormality of the node 310d is detected again by the system management process of the node 310c (S33). As a result of the reactivation, if the node 310d is normally restored, the process ends there.

Subsequently, the system management process determines to cause the node 310c and the node 310e to respectively execute the processes 331g and 331h executed in the still abnormal node 310d (not shown). In this case, the nodes 310c and 310e that activate the processes 331g and 331h are determined by the method described above, and the node 310e may be a node that is already activated or may be a node that is newly activated. The processes 331g and 331h executed in the node 310d are figured out by the system management process by referring to the system information.

Subsequently, the system management process instructs the node management process of the node 310c to activate the process 331g (S34). The system management process instructs the node management process of the node 310e to activate the process 331h (S35).

When the activation instruction of the process 331g is received by the node management process of the node 310c, the process 331g is activated as shown by a hatched block of FIG. 9. When the process 331g is activated, the node management process of the node 310c (or the process 331g) notifies the system management process of the normal activation of the process (S36).

When the activation instruction of the process 331h is received by the node management process of the node 310e, the process 331h is activated as shown by a hatched block of FIG. 9. When the process 331h is activated, the node management process of the node 310e (or the process 331h) notifies the system management process of the normal activation of the process (S37). This is the process executed between the nodes 310 according to the present embodiment.

As described, when there is an abnormality in the process 331 activated in each node 310 or in the node 310 itself, or when the node is not appropriately restored after an occurrence of an abnormality, another node 310 may activate the process 331 in which there is an abnormality.

As a result, even if there is an abnormality in each node 310 or the process 331, the distributed multi-CPU control system 1 can surely function.

<Fifth Embodiment>

Figure 11:
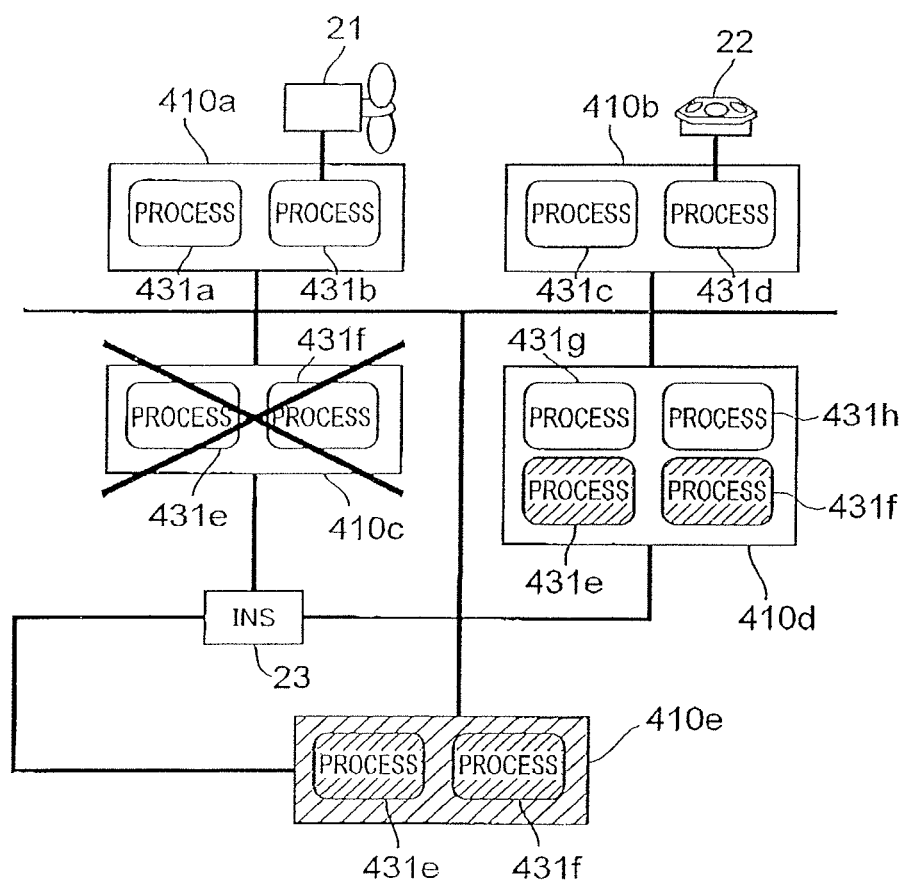
FIG. 11 is a diagram showing a configuration of a distributed multi-CPU control system including nodes according to a fifth embodiment of the present invention.

Subsequently, a variation of management based on the management of the distributed multi-CPU control system 1 in the third embodiment will be illustrated as in the fourth embodiment. FIG. 11 shows a configuration of the distributed multi-CPU control system 1 including nodes 410a to 410e according to the present embodiment. In FIG. 11, the processes related to the functions of the present invention described above are omitted, and only normal processes 431a to 431h are illustrated. The hatched processes 431e and 431f in the node 410d as well as the processes 431e and 431f in the node 410e are not initially executed. These are activated in the course of the control.

Only the processes 431 activated in the nodes 410 physically connected (bonded) to a device through cables or the like can monitor and control the device. For example, three nodes, the nodes 410c, 410d, and 410e, are connected (parallel bonding) to the inertial navigation system 23 as shown in FIG. 11, and only the processes on the nodes 410 can monitor and control the inertial navigation system 23. When there is an abnormality in a process 431 or a node 410 that controls a highly important device, or when reactivation is performed due to an abnormality, the device cannot be controlled during that time. Therefore, in such a case, the system management process activates the process on another node 410 connected to the device. The process 431 activated in this case may be redundantly activated by different nodes 410. As a result, the function is supplemented, and the device is surely controlled.

If the process 431 and the node 410 that have been initially controlling the device are normally restored as a result of the reactivation, the control of the device may be returned to the original process 431 and the node 410, or the control by the process 431 and the node 410 that have supplemented the function may be continued.

A node 410 for backup is prepared for the device important for the control, and the device is physically connected to a plurality of nodes 410. The node 410 that newly activates the process 431 may be a node 410 activated in advance (in a standby state), or a node may be activated when the process 431 is activated. The system management process makes the selection in consideration of the system state, the system configuration (the number of nodes, the number of processes, and the operation time), the connection device configuration, and the like.

Figure 12:
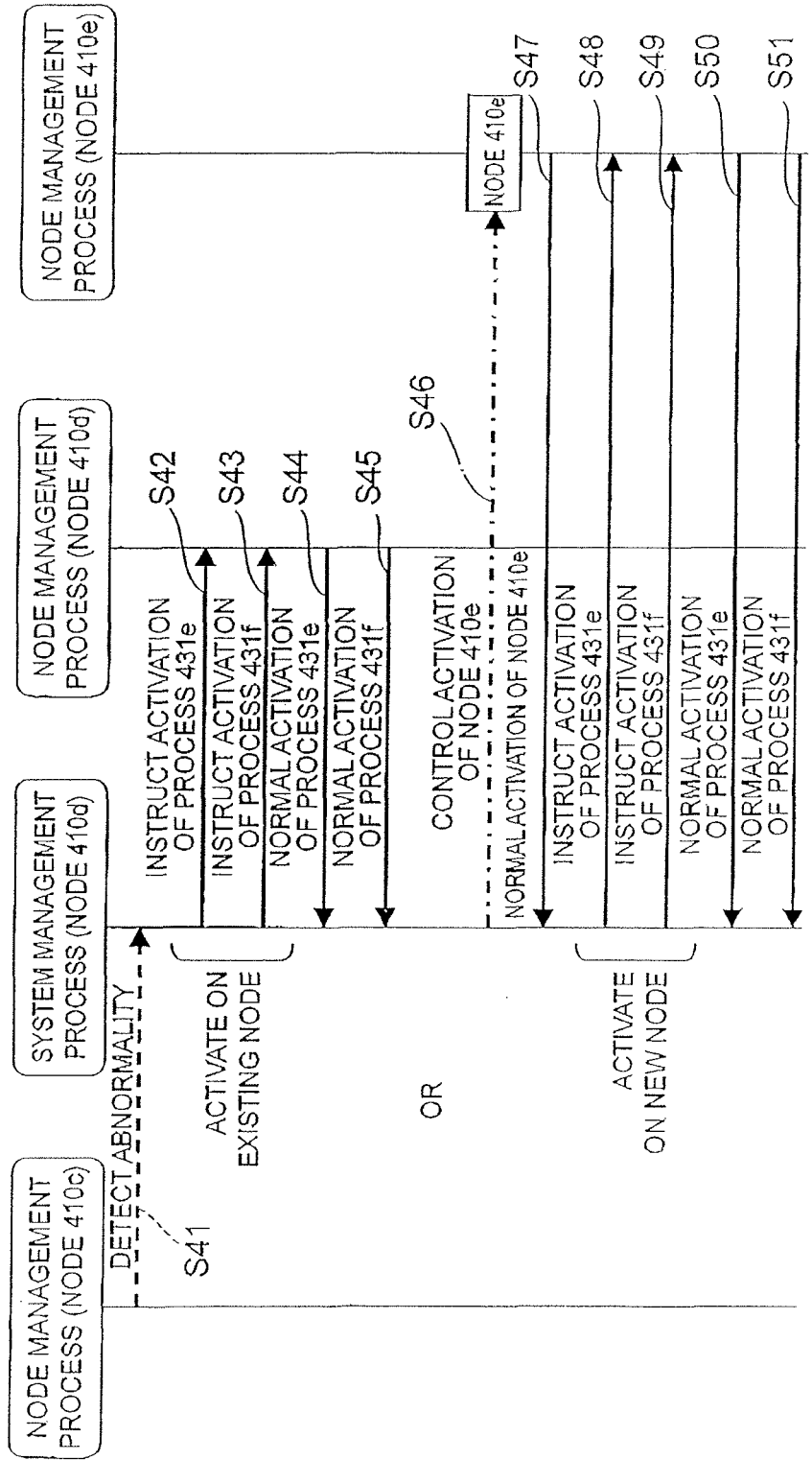
FIG. 12 is a sequence diagram showing a process executed by the distributed multi-CPU control system including the nodes according to the fifth embodiment of the present invention.

Subsequently, a process executed between the nodes 410 according to the present embodiment will be described with reference to a configuration diagram of FIG. 11 and a sequence diagram of FIG. 12. In the present process, the processes 431e and 431f of the node 410c monitor and control the inertial navigation system 23. As described, three nodes, the nodes 410c, 410d, and 410e, are connected to the inertial navigation system 23. The node 410e is not activated at the start of the process. The present process is executed when there is an abnormality in the node 410c. In the present process, the system management process of managing the nodes 410a to 410e is executed in the node 410d.

When there is an abnormality in the node 410c, the system management process of the node 410d refers to the system information to detect the abnormality of the node 410c (S41).

Subsequently, the system management process determines to cause the node 410d to execute the processes 431e and 431f of monitoring and controlling the inertial navigation system 23 executed in the node 410c with the detected abnormality (not shown). In this case, the node 410 that activates the processes 431e and 431f are determined by the method described above. The process process 431e and 431f executed in the node 410c are figured out by the system management process by referring to the system information. After the detection of the abnormality of the node 410c, control for restoring the node 410c, such as control of reactivating the node 410c, may be performed as in the embodiments described above.

Subsequently, the system management process instructs the node management process of the node 410d to activate the process 431e (S42). The system management process instructs the node management process of the node 410d to activate the process 431f (S43).

When the activation instruction of the process 431e is received by the node management process of the node 410d, the process 431e is activated as shown by a hatched block of FIG. 11. When the process 431e is activated, the node management process of the node 410d (or the process 431e) notifies the system management process of the normal activation of the process (S44).

When the activation instruction of the process 431f is received by the node management process of the node 410d, the process 431f is activated. When the process 431f is activated, the node management process of the node 410d (or the process 4310 notifies the system management process of the normal activation of the process (S45). If, for example, the process 431f is not an important process (if the process can be executed after the restoration of the node 410c), the process 431f may not be necessarily activated in the node 410d.

The following process may be executed in the process of S42 to S45. First, the system management process controls the activation of the node 410e (S46). The determination of activating the node 410e by the system management process is made as described above.

Specifically, the control of the activation of the node 410e (not activated) by the system management process is control of power supply to the node 410e, and for example, the control is performed by turning on the power supply of the node 410e. However, the control of the activation of the node 410e may be performed by a method other than the method described above. When the node 410e is activated as a result of the control of the activation by the system management process, the node management process of the node 410e notifies the system management process of the normal activation of the node 410e (S47).

Subsequently, the system management process instructs the node management process of the node 410e to activate the process 431e (S48). The system management process instructs the node management process of the node 410e to activate the process 431f (S49).

When the activation instruction of the process 431e is received by the node management process of the node 410e, the process 431e is activated as shown by a hatched block of FIG. 11. When the process 431e is activated, the node management process of the node 410e (or the process 431e) notifies the system management process of the normal activation of the process (S50).

When the activation instruction of the process 431f is received by the node management process of the node 410e, the process 431f is activated as shown by a hatched block of FIG. 11. When the process 431f is activated, the node management process of the node 410e (or the process 4310 notifies the system management process of the normal activation of the process (S51). This is the process executed between the nodes 410 according to the present embodiment.

As described, when there is an abnormality in the node 410 or the process 431 connected to a highly important device, another node 410 connected to the device may activate the process 431 in which there is the abnormality. As a result, even if there is an abnormality in the node 410 or the process 431 connected to the device, the device can be surely monitored and controlled.

<Sixth Embodiment>

Figure 13:
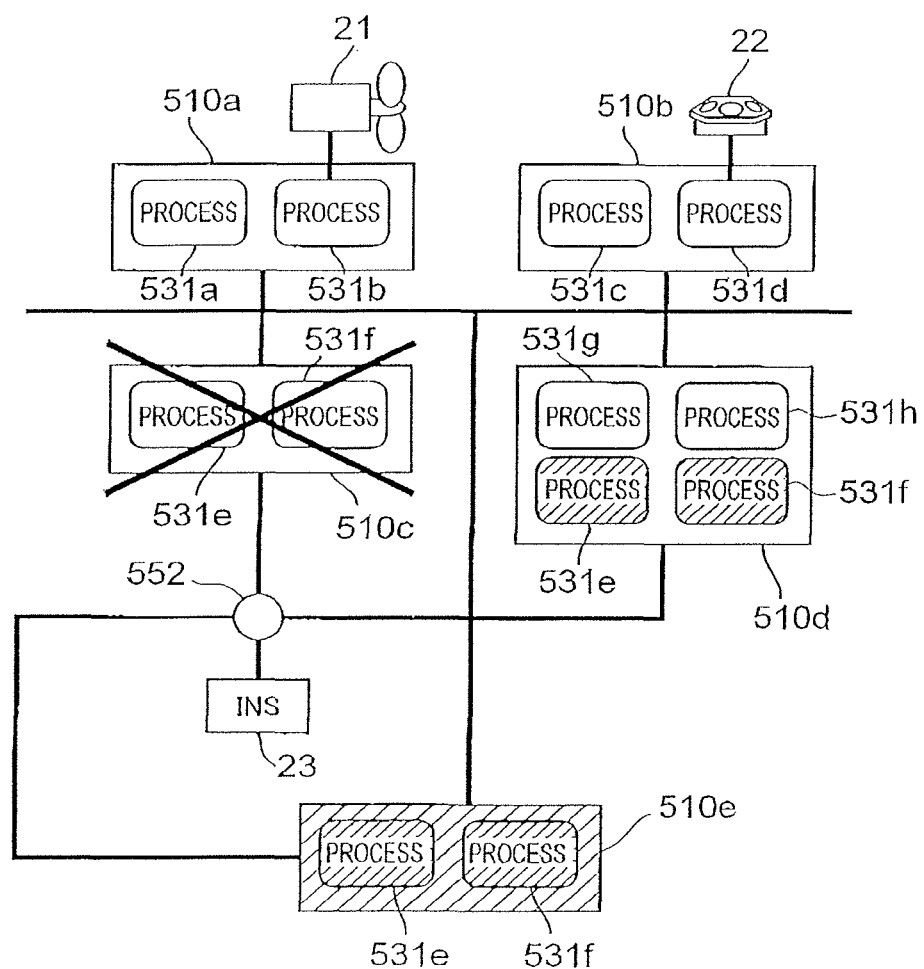
FIG. 13 is a diagram showing a configuration of a distributed multi-CPU control system including nodes according to a sixth embodiment of the present invention.

FIG. 13 shows a configuration of the distributed multi-CPU control system 1 including nodes 510a to 510e according to the present embodiment. As shown in FIG. 13, a control system switching apparatus 552 may be arranged between the devices and the nodes to surely control the devices by specific nodes 510 or processes 531. The control system switching apparatus 552 is an apparatus controlled by the system management process to permit transmission and reception of information only between specific nodes 510 or specific processes 531 designated by the system management process.

When there is an abnormality in a process 531 or a node 510 that controls a highly important device, the system management process switches the process 531 or the node 510 that transmits and receives information to and from the device to cause the switched process 531 or node 510 to monitor and control the device. As a result, the device is more appropriately controlled.

Figure 14:
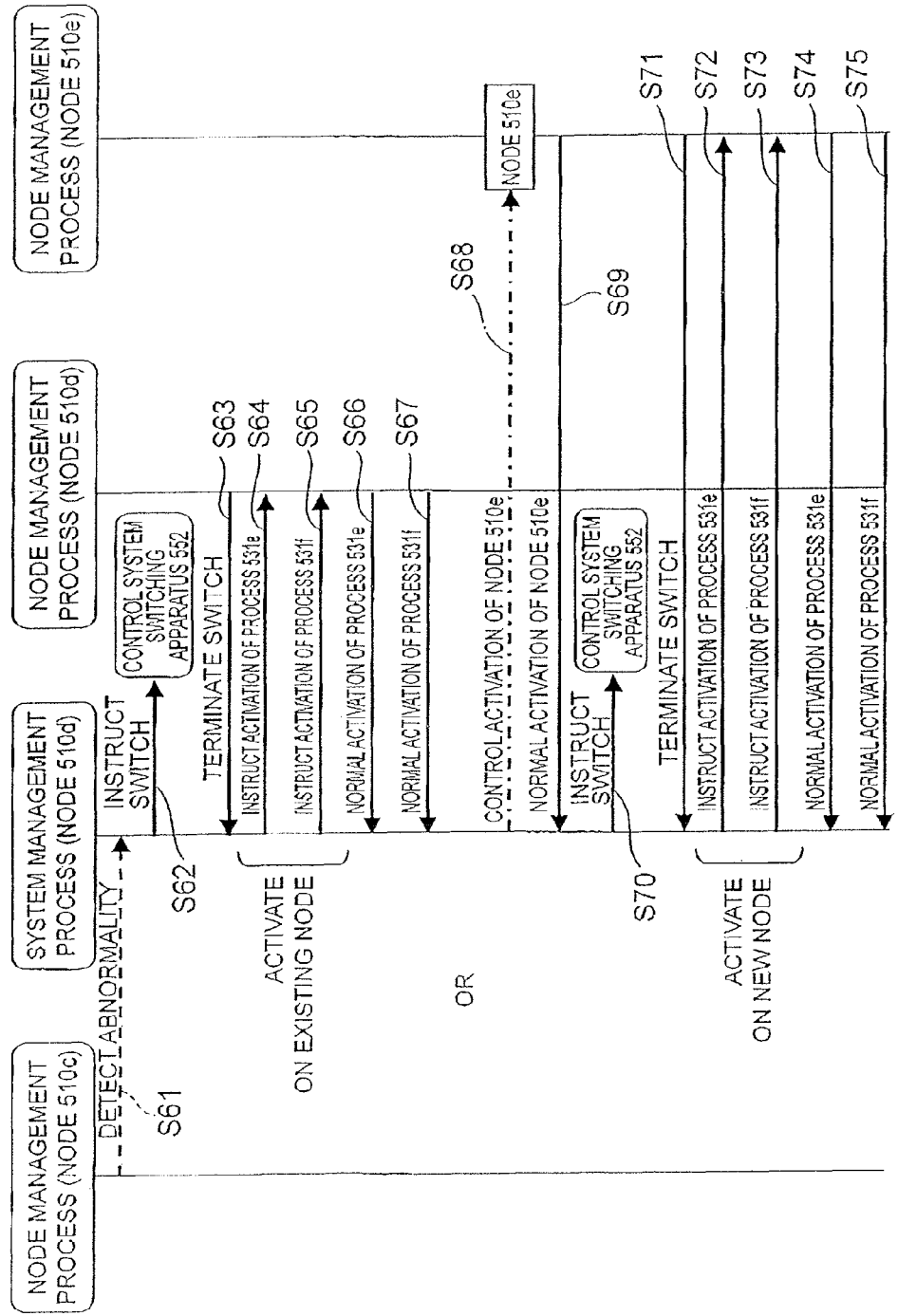
FIG. 14 is a sequence diagram showing a process executed by the distributed multi-CPU control system including the nodes according to the sixth embodiment of the present invention.

Subsequently, a process executed between the nodes 510 according to the present embodiment will be described with reference to a configuration diagram of FIG. 13 and a sequence diagram of FIG. 14. In the present process, processes 531e and 531f of the node 510c monitor and control the inertial navigation system 23. As described, three nodes, the nodes 510c, 510d, and 510e, are connected to the inertial navigation system 23. The control system switching apparatus 552 is arranged between the inertial navigation system 23 and the nodes 510c, 510d, 510e. The control system switching apparatus 552 permits transmission and reception of information between the node 510c and the control system switching apparatus 552. The node 510e is not activated at the start of the process. The present process is executed when there is an abnormality in the node 510c. In the present process, a system management process of managing the nodes 510a to 510e is executed in the node 510d.

When there is an abnormality in the node 510c, the system management process of the node 510d refers to the system information to detect the abnormality of the node 510c (S61).

Subsequently, the system management process determines to cause the node 510d to execute the processes 531e and 531f of monitoring and controlling the inertial navigation system 23 executed in the node 510c with the detected abnormality (not shown). In this case, the node 510 that activates the processes 531e and 531f is determined by the method described above. Subsequently, the system management process issues a switch instruction to the control system switching apparatus 552 to permit transmission and reception of information between the node 510d and the inertial navigation system 23 (S62).

The control system switching apparatus 552 that has received the switch instruction executes a switching process and notifies the switched node 510d of the switch. In the switched node 510d, the node management process receives the notification, and the system management process is notified of the completion of the switch (S63)

The process process 531e and 531f executed in the node 510c are figured out by the system management process by referring to the system information. After the detection of the abnormality of the node 510c, control of restoring the node 510c, such as control of reactivating the node 510c, may be performed as in the embodiments described above.

Subsequently, the system management process instructs the node management process of the node 510d to activate the process 531e (S64). The system management process instructs the node management process of the node 510d to activate the process 531f (S65).

When the activation instruction of the process 531e is received by the node management process of the node 510d, the process 531e is activated as shown by a hatched block of FIG. 13. When the process 531e is activated, the node management process of the node 510d (or the process 531e) notifies the system management process of the normal activation of the process (S66).

When the activation instruction of the process 531f is received by the node management process of the node 510d, the process 531f is activated. When the process 531f is activated, the node management process of the node 510d (or the process 5310 notifies the system management process of the normal activation of the process (S67). If, for example, the process 531f is not an important process (if the process can be executed after the restoration of the node 510c), the process 531f may not be necessarily activated in the node 510d.

The following process may be executed in the process after S62. First, the system management process controls the activation of the node 510e (S68). The determination of activating the node 510e by the system management process is executed as described above.

The control of the activation of the node 510e is performed as in the method described above. When the node 510e is activated as a result of the control of the activation by the system management process, the node management process of the node 510e notifies the system management process of the normal activation of the node 510e (S69).

Subsequently, the system management process issues a switch instruction to the control system switching apparatus 552 to permit transmission and reception of information between the node 510e and the inertial navigation system 23 (S70). The control system switching apparatus 552 that has received the switch instruction executes a switching process, and the node management process of the switched node 510e transmits and receives information to and from the inertial navigation system 23 and notifies the system management process of the completion of the switch (S71).

Subsequently, the system management process instructs the node management process of the node 510e to activate the process 531e (S72). The system management process instructs the node management process of the node 510e to activate the process 531f (S73).

When the activation instruction of the process 531e is received by the node management process of the node 510e, the process 531e is activated as shown by a hatched block of FIG. 13. When the process 531e is activated, the node management process of the node 510e (or the process 531e) notifies the system management process of the normal activation of the process (S74).

When the activation instruction of the process 531f is received by the node management process of the node 510e, the process 531f is activated as shown by a hatched block of FIG. 13. When the process 531f is activated, the node management process of the node 510e (or the process 5310 notifies the system management process of the normal activation of the process (S75). This is the process executed between the nodes 510 according to the present embodiment.

According to the configuration, the device is controlled by a specific node or process determined by the system management process. As a result, the device can be appropriately monitored and controlled.

<Seventh Embodiment>

Figure 15:
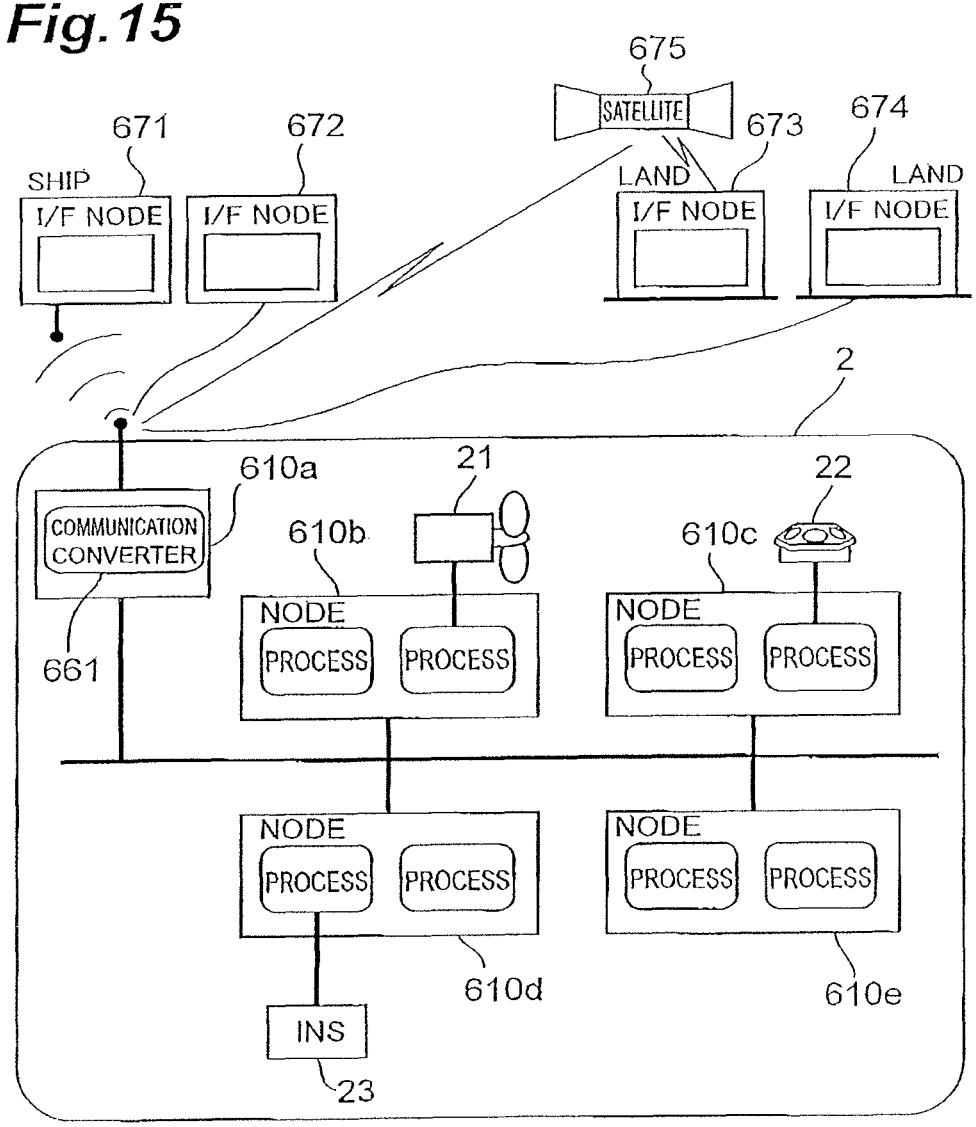
FIG. 15 is a diagram showing a distributed multi-CPU control system including nodes according to a seventh embodiment of the present invention.

FIG. 15 shows a configuration of the distributed multi-CPU control system 1 according to the present embodiment. As shown in FIG. 15, the distributed multi-CPU control system 1 is included in an undersea device 2 in the present embodiment. A node 610a included in the distributed multi-CPU control system 1 includes a communication converter 661 in addition to the configuration of the embodiments described above. The communication converter 661 forms communication means for communicating with an apparatus other than the distributed multi-CPU control system 1 to transmit and receive the system information stored in the shared memory.

Examples of the apparatus other than the distributed multi-CPU control system 1 that communicates with the communication converter 661 include: a wireless communication apparatus (I/F node) 671 via electromagnetic waves, sound, and the like as well as a wire communication apparatus (I/F node) 672 via electric cables, optical fiber cables, and the like that are arranged on a ship as shown in FIG. 15; a satellite communication apparatus (I/F node) 673 as well as a wire communication apparatus (I/F node) 674 via electric cables, optical fiber cables, and the like that are arranged on the land; and a satellite 675 that links the undersea device 2 and the I/F node 673. The communication may be performed through wireless communication or through wires.

The input and output of the system information stored in the shared memory allows remote monitoring of the state of the undersea device 2 from the outside of the undersea device 2 and allows remote control of the undersea device 2.

Subsequently, further modified examples of the embodiments will be described. In each node of the distributed multi-CPU control system, a process that functions as risk estimation means for estimating the risk of occurrence of abnormality in its own node or in a process executed by its own node may be executed. The information indicating the estimated risk is included in the system information and shared between the nodes according to the configuration illustrated in the first or second embodiment. The process for which the risk is estimated may be all processes activated by the node or may be a specific process.

The risk of occurrence of abnormality indicates a probability that the node or the process will not function. The risk of the process is calculated (estimated) by, for example, weighting the number (frequency) of errors per hour in the device controlled by each process, according to the device and details of the errors.

Specifically, the following formula can be used for the calculation.

$$Dp = \alpha \cdot Ecom + \beta \cdot Em1 + \gamma \cdot Em2$$

Here, Dp denotes a process abnormality risk, Ecom denotes the number of errors in communication with the device controlled by the process, Em1 denotes the number of error messages 1 from the device controlled by the process, and Em2 denotes the number of error messages 2 from the device controlled by the process. Ecom, Em1, and Em2 are monitored by the process state monitoring process and stored in the system information for example, and the system information is referenced. The characters $\alpha$, $\beta$, and $\gamma$ are weights defined according to the importance of the details and are set and stored in advance in the process for which the risk is calculated.

For the risk of the node, non-dimensional evaluation values of the risk of abnormality of each process activated in the node, the remaining storage capacity of the node, the used amount of memory, the CPU load, and the like are used, for example. Alternatively, each detail is handled as an individual item to evaluate the risk of each item.

Specifically, the following formula can be used for the calculation.

$$Dn = \alpha \cdot (Dp1 + Dp2 + Dp3) + \beta \cdot CM + \gamma \cdot CF + \eta \cdot CP$$

Here, Dn denotes a node abnormality risk, Dp1, Dp2, and Dp3 denote process abnormality risks of (three) processes activated by the node, CM denotes a remaining amount of the shared memory of the node, CF denotes a remaining storage area of the node, and CP denotes a CPU load of the node. CM, CF, and CP are monitored by the node state monitoring process and stored in the system information for example, and the system information is referenced. The characters $\alpha$, $\beta$, $\gamma$, and $\eta$ are defined according to the importance of the details, are non-dimensional weights of the details (items), and are set and stored in advance in the process for which the risk is calculated.

The system management process refers to the calculated risk of each node and each process included in the system information to perform the control, such as reactivation, as described in the third to sixth embodiments before the occurrence of abnormality in each node and each process. Specifically, for example, the control of reactivation is performed when the value of the risk exceeds a threshold that is set and stored in advance.

The distributed multi-CPU control system may include a node for emergency that is a node for activating a process specializing in emergency (process for emergency). In the method as described in the fifth and sixth embodiments, the system management process determines that there is an emergency when a highly important device is not restored, and the process for emergency of the node for emergency is controlled to execute the entire subsequent process. For example, in the undersea device, all nodes and processes other than the node necessary for the emergency process are terminated by a regular procedure, and after the system soundness (avoidance of node destruction, data damage, and the like) is secured by the termination, the undersea device is controlled to a state that allows self-surfacing or emergency recovery, such as by separating the ballast.

In the distributed multi-CPU control system, a general-purpose communication protocol may be applied to establish a primary network and to realize the embodiments, and another communication protocol may be applied to establish a secondary network at the same time to realize part or all of the embodiments in emergency, thereby forming a redundant configuration. For example, Ethernet is applied as a primary network, and CANbus is applied as a secondary network of another system. In this way, even if there is a malfunction in Ethernet communication, the communication between the nodes is built by switching to CANbus communication, and the function of a node that controls a highly important device or the function of an emergency node is secured.

In the present embodiment, application to the underwater vehicle has been described. The present invention may be applied to a system in which the distributed multi-CPU control system is used and long-time human access is difficult. Alternatively, the present invention may be applied to a system in which even significantly short-time ignorance is not permitted (quick restoration is necessary) when there is a malfunction.

In the control system of an autonomous underwater vehicle according to the present embodiment, although a sudden, accidental, unexpected malfunction occurs in a long-time cruise, support from the outside is difficult because the underwater vehicle is self-propelled. Therefore, self-restoration capability is essential in the control system. Since navigation devices and observation devices are frequently exchanged according to the mission, a control system that can flexibly handle the change in the system configuration is necessary.

The present invention may also be applied to a control system in a seafloor observation station or to a control system in an intelligent buoy. In the seafloor observation station and the intelligent buoy that are set on the seafloor for a long time, time-oriented malfunctions occur due to aging of the devices, or the devices are exchanged according to what is observed. However, since the recovery of the seafloor observation station or the intelligent buoy is geographically difficult or is difficult in terms of cost, the capability of self-repairing of the malfunction on the site (sea floor or on the sea) is essential. A control system that can flexibly handle the change in the system configuration associated with the exchange of the devices is also necessary.

The present invention may also be applied to a control system in an unmanned space station, to a control system in an artificial satellite, and to an unmanned planetary explorer. In the systems and the apparatuses arranged in the space for a long time, time-oriented malfunctions occur due to aging of the devices, and the devices are exchanged according to what is observed. However, since the recovery is significantly difficult in such a situation, the capability of self-repairing of the malfunction on the site (space) is essential.

The present invention may also be applied to a control system in a nuclear reactor. In an environment in which human access is difficult, down (out of control) of the system is not allowed even for a short time when there is a malfunction, and quick self-restoration is essential.

Reference Signs List

1 ... distributed multi-CPU control system, 2 ... undersea device, 10, 110, 210, 310, 410, 510, 610 ... nodes, 11 ... CPU, 12 ... memory, 13 ... communication module, 21 ... thrusters, 22 ... speed meter, 23 ... inertial navigation system, 31, 131, 231, 331, 431, 531 ... processes, 41, 141 ... shared memory control processes, 242 ... system management process, 243 ... node management process, 244 ... process state monitoring process, 245 ... node state monitoring process, 51, 151, 251 ... shared memories, 552 ... control system switching apparatus, 661 ... communication converter, 671 to 674 ... communication apparatuses (I/F nodes), 675 ... satellite

The invention claimed is:

1. A node that includes a CPU and that is connected to other nodes to constitute a computer system, the node comprising:
process execution means for executing one or more processes including predetermined functions;
a shared memory that stores system information including process information related to each process executed by each node included in the computer system, in a state accessible from each process executed by the process execution means;
system information transmission means for multicasting system information including process information related to each process executed by the process execution means in the system information to the other nodes; and
system information storage means for receiving the system information multicast from the other nodes to store the system information in the shared memory,
wherein the system information stored in the shared memory is shared between the node and the other nodes causing the system information in the shared memory to be identical between the node and the other nodes.

2. The node according to claim 1, wherein
the process executed by the process execution means causes the shared memory to store the process information related to its own process as the system information, and
the system information transmission means reads the system information stored in the shared memory to multicast the system information to the other nodes.

3. The node according to claim 1, wherein
the process executed by the process execution means constitutes the system information transmission means to multicast the system information including the process information related to its own process to the other nodes.

4. The node according to claim 1, further comprising
system management means for monitoring the system information stored in the shared memory to control the process or the node according to the system information.

5. The node according to claim 4, further comprising
node management means for monitoring a state of its own node or the process executed by its own node to set information indicating the state as the system information multicast by the system information transmission means.

6. The node according to claim 4, further comprising
risk estimation means for estimating a risk of occurrence of abnormality in its own node or the process executed by its own node to set information indicating the estimated risk as the system information multicast by the system information transmission means, wherein
the system management means controls the process or the node based on the risk estimated by the risk estimation means.

7. The node according to claim 1, further comprising
communication means for communicating with an apparatus other than the computer system to transmit and receive the system information stored in the shared memory.

8. A node that is connected to other nodes to constitute a computer system, the node comprising:
a CPU configured to execute one or more processes including predetermined functions;

a shared memory configured to store system information including process information related to each process executed by each node included in the computer system, wherein the system information is stored in the shared memory in a state accessible from each process executed by the CPU; and a system information transmitter configured to multicast system information including process information related to each process executed by the CPU to the other nodes;

wherein the CPU is configured to cause the system information multicast received from the other nodes to be stored in the shared memory, and wherein the system information stored in the shared memory is shared between the node and the other nodes causing the system information in the shared memory to be identical between the node and the other nodes.

9. A computer system, comprising:

a plurality of nodes connected with each other over a network, wherein each node of the plurality of nodes comprises:

a CPU configured to execute one or more processes including predetermined functions;

a shared memory configured to store system information including process information related to each process executed by each node among the plurality of nodes included in the computer system, wherein the system information is stored in the shared memory in a state accessible from each process executed by the CPU; and a system information transmitter configured to multicast system information including process information related to each process executed by the CPU to other nodes among the plurality of nodes in the computer system;

wherein the CPU is configured to cause the system information multicast received from the other nodes to be stored in the shared memory, and wherein the system information stored in the shared memory is also stored in the shared memories of the other nodes, and includes the process information related to each process executed by each node among the plurality of nodes in the computer system.

* * * * *